L. S. GILL.
TIRE PROTECTOR.
APPLICATION FILED NOV. 20, 1912.
1,086,815.
Patented Feb. 10, 1914.
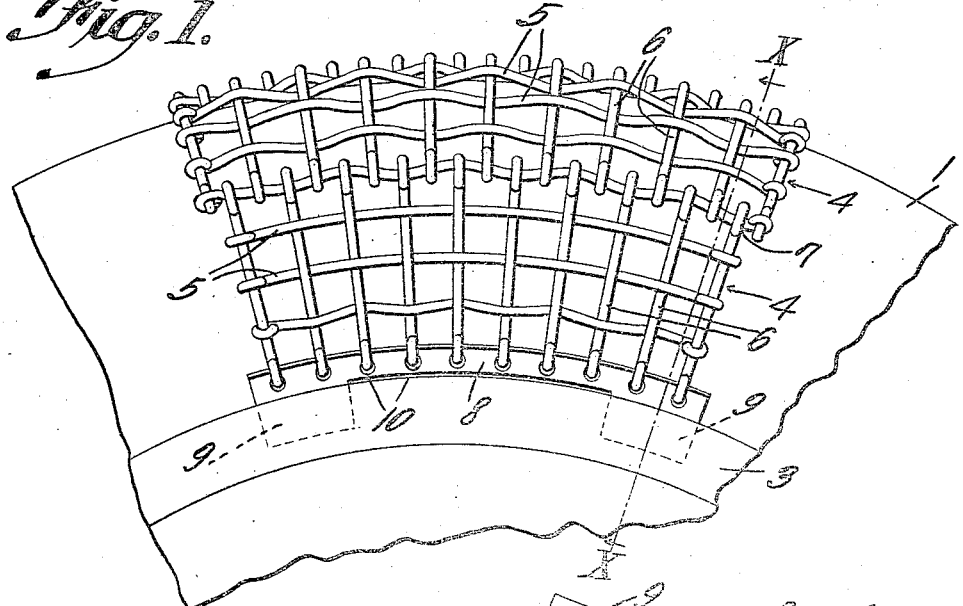
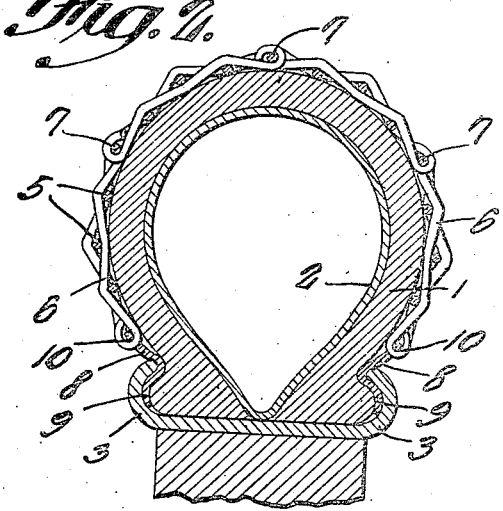
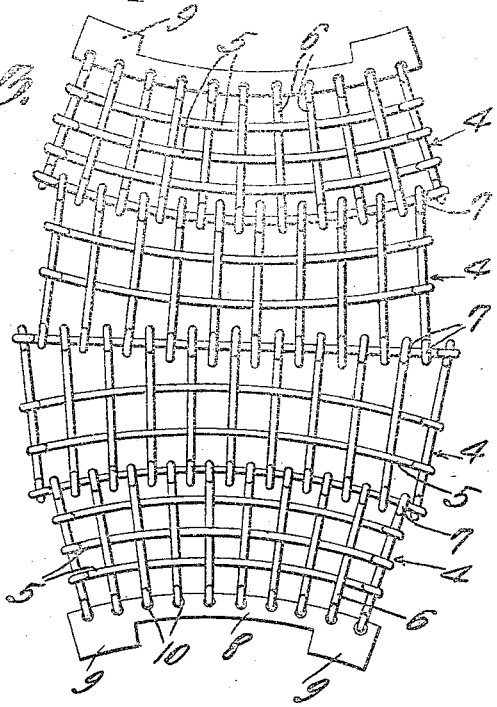
Witnesses
Leland S. Gill, Inventor
by Attorneys

UNITED STATES PATENT OFFICE.

LELAND S. GILL, OF ELKO, NEVADA.

TIRE-PROTECTOR.

1,086,815.

Specification of Letters Patent.  Patented Feb. 10, 1914.

Application filed November 20, 1912.  Serial No. 732,581.

*To all whom it may concern:*

Be it known that I, LELAND S. GILL, a citizen of the United States, residing at Elko, in the county of Elko and State of Nevada, have invented a new and useful Tire-Protector, of which the following is a specification.

My invention relates to new and useful improvements in tire protectors and the primary object of the invention is the provision of a device of this character which can be secured to a tire over weak spots or over a torn place in the tire.

A further object is the provision of a protector which when applied will prevent skidding.

With these and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings: Figure 1 is a side view showing the protector attached to the tire. Fig. 2 is a transverse section on the line X—X of Fig. 1. Fig. 3 is a top plan view of the protector.

In the drawings the numeral 1 indicates the outer casing, 2 the inner tube, and 3 the tire clenching channels. The protector is composed of a plurality of sections as indicated by 4 and each section is composed of the longitudinal strands 5 and the transverse strands 6. The ends of the transverse strands of one section are bent around the longitudinal strands of the adjacent section as shown at 7 to form a hinge. Secured to each side section is a plate 8 which is provided with the hooks 9 for engaging the tire clenchers. These plates are provided with perforations through which the ends of the transverse strands are hooked as shown at 10.

In Fig. 3 I have shown the protector lying flat before being applied to the tire and it will be seen that it is of such shape as to conform to the curvature of the tire when applied.

It will be seen that when this protector is placed over a weak or torn place in the tire it will protect the same and will prevent a "blow-out." It will also be seen that when applied it will prevent skidding.

Having fully described my invention what I claim and desire to secure by Letters Patent is:

1. A tire protector comprising a plurality of hinged sections, each of which is composed of longitudinal and transverse strands, the transverse strands of one section engaging a longitudinal strand of the adjacent section for forming the hinge, and means for securing the protector to the tire.

2. A tire protector comprising a plurality of hinged sections, each of which is composed of longitudinal and transverse strands, the transverse strands of one section engaging a longitudinal strand of the adjacent section for forming the hinge, and the transverse strands of one section being received between the transverse strands of the adjacent section.

3. A tire protector comprising a plurality of sections, each of which is composed of longitudinal and transverse strands, the transverse strands of one section engaging a longitudinal strand of the adjacent section for forming the hinge, and hook members connected to the transverse strands of the side sections for securing the protector to the tire.

In testimony that I claim the foregoing as my own, I have hereto affixed my signature in the presence of two witnesses.

LELAND S. GILL.

Witnesses:
JAMES MARR,
E. C. BENTLEY.